US008711226B2

(12) United States Patent
Fathollahi (10) Patent No.: US 8,711,226 B2
(45) Date of Patent: Apr. 29, 2014

(54) METHOD AND SYSTEM FOR VIDEO PARAMETER ANALYSIS AND TRANSMISSION

(71) Applicant: Ampronix, Inc., Irvine, CA (US)

(72) Inventor: Nausser Fathollahi, Laguna Niguel, CA (US)

(73) Assignee: Ampronix, Inc., Irvine, CA (US)

( * ) Notice: Subject to any disclaimer, the term of this patent is extended or adjusted under 35 U.S.C. 154(b) by 0 days.

(21) Appl. No.: 13/943,631

(22) Filed: Jul. 16, 2013

(65) Prior Publication Data

US 2013/0300879 A1 Nov. 14, 2013

Related U.S. Application Data

(63) Continuation of application No. 12/410,752, filed on Mar. 25, 2009, now abandoned.

(51) Int. Cl.
*H04N 17/00* (2006.01)
*H04N 17/02* (2006.01)
(52) U.S. Cl.
CPC .............. *H04N 17/00* (2013.01); *H04N 17/02* (2013.01); *H04N 17/004* (2013.01)
USPC .................. 348/180; 348/189; 348/739
(58) Field of Classification Search
CPC ....... H04N 17/00; H04N 17/02; H04N 17/004
USPC ......... 348/571, 575, 189, 180, 181, 184, 191, 348/739; 345/204, 660; 382/286
See application file for complete search history.

(56) References Cited

U.S. PATENT DOCUMENTS

| 7,920,151 B2 | 4/2011 | MacInnis et al. |
| 8,120,707 B2 | 2/2012 | Raines |
| 2009/0128696 A1 | 5/2009 | Ideura et al. |

*Primary Examiner* — Jefferey Harold
*Assistant Examiner* — Jean W Desir
(74) *Attorney, Agent, or Firm* — Stetina Brunda Garred & Brucker (57) ABSTRACT

A system for analyzing video signals generated by an imaging modality is disclosed. The system includes a video signal input port to which a signal output of the imaging modality being can be connected. Additionally, there is a central processor that includes an analog input module, a signal analysis module, and a data communications module. A plurality of video signal parameters may be measurable from the video signal by the signal analysis module. The system also includes a data output port that is linked to the data communications module of the central processor, which is connectable to an external device for transferring the measure signal parameters thereto.

22 Claims, 8 Drawing Sheets

*Form 100 — Signamaxx*

- 102 — Hospital Information
  - Name:
  - Address:
  - Phone:
  - Fax: (Optional)
  - E-Mail: (Optional)

- 104 — Contact Information
  - Name:
  - Work Phone:
  - Mobile Phone: (Optional)
  - Fax: (Optional)
  - E-Mail:

- 106 — Current Monitor Information
  - Manufacturer
  - Part Number (Optional)
  - Model Number
  - Size
  - How many BNC Cables Connected? ○1 ○2 ○3 ○4 ○5
  - Monitor Type: ○Monochrome ○Color
  - Type of Connection: ○BNC ○D-Sub 15 ○Other

- 108 — Modality Information
  - Modality Type:
  - Modality Manufacturer:
  - Modality Series / Model:

- 110 — Order Information
  - Purchase Order: (Optional)
  - Ampronix Ref. Number: (Optional)
  - Shopping Method: (Optional) ○Next Day ○Two Day ○Other:
  - [Cancel] [Submit]

METHOD AND SYSTEM FOR VIDEO PARAMETER ANALYSIS AND TRANSMISSION

CROSS-REFERENCE TO RELATED APPLICATIONS

The present application is a continuation of U.S. application Ser. No. 12/410,752 filed on Mar. 25, 2009, the entire content of which incorporated herein by reference.

STATEMENT RE: FEDERALLY SPONSORED RESEARCH/DEVELOPMENT

Not Applicable

BACKGROUND

1. Technical Field

The present invention relates generally to video signal analysis, and more particularly, to methods and systems for analyzing and transmitting video signal parameters from arbitrary signal sources of imaging modalities including medical devices.

2. Related Art

As a general matter, the display of video on conventional display devices involves electrical signals that sweep or scan across the field of the screen one line at a time, with the amplitude at a given point in time being representative of the instantaneous brightness at corresponding location on the screen. The picture may be interlaced, where each frame is divided into two fields that are each scanned separately, or progressive, where all of the horizontal lines in the field are scanned in a single pass. There are a number of ways to structure the signal to provide different display characteristics such as resolution, frame rate, aspect ratio, color space, and the like. The signal is segregated into multiple parts, with each part corresponding to a different type of display information. These signaling systems were originally developed for analog cathode ray tube (CRT) devices, though the principles are equally applicable to more modern technologies such as liquid crystal displays (LCDs), plasma display panels, light emitting diode (LED) displays, organic light emitting diode (OLED) displays, and so forth.

In order to properly display the video, it is necessary for the display device to be coordinated with the device generating the video signal. Certain key parameters must be matched between the generating device and the display device. Because broadcast television sets are manufactured by a wide variety of companies different from those manufacturing the signal generators, a number of standards have been developed and promulgated to ensure compatibility. For example, television sets used in the United States, Japan, and a few other countries conform to the National Television System Committee (NTSC) standard, while European countries and certain others conform to the Phase Altering Line (PAL) standard. Additionally, computer display devices similarly have various standards such as Video Graphics Array (VGA), eXtended Graphics Array (XGA), and the like.

Electronic displays are frequently utilized in medical imaging/diagnostic systems. There are various such imaging modalities, including Computed Tomography (CT), Magnetic Resonance Imaging (MRI), catheterization imaging, Computed Radiography (CR), Positron Emission Tomography (PET) and other nuclear medicine diagnostic systems, and ultrasound. Because the display devices were typically developed in conjunction with the imaging modalities, it was unnecessary to develop display standards as with broadcast video and computer systems. Accordingly, there are a vast number of presently deployed imaging modalities that have different, undocumented video signal parameters. Furthermore, there is no known compilation of all of the video signal parameters for all of existing imaging modalities.

When the display devices connected to these imaging modalities malfunction, it is often difficult to select a suitable replacement device because of the unknown video signal parameters. Furthermore, as more advanced display devices become more widely available relative to the older CRT devices, there has been an industry trend to replace such legacy components with newer alternatives such as, for example, LCD displays. But again, because of the lack of complete and accurate information for the video signal parameters of the imaging modalities, a component upgrade program has been difficult to manage. Conventionally, the output signal from the imaging modality must be analyzed with an oscilloscope in a time-consuming process, which requires a qualified on-site technician. In the alternative, the legacy display device may be sent to a maintenance center, whereupon it is examined to ascertain the unknown video signal parameters in a lengthy trial-and-error procedure. With the aforementioned upgrade programs, a video scaler may be programmed and attached to the imaging modality to drive the new LCD display, but the need to ascertain the appropriate video signal parameters still remains. Accordingly, there is a need in the art for an improved method and system for video parameter analysis and transmission.

BRIEF SUMMARY

According to one embodiment of the present invention, a system for analyzing video signals generated by an imaging modality is contemplated. The system may include a video signal input port to which a signal output of the imaging modality being can be connected. Additionally, there may be a central processor that includes an analog input module, a signal analysis module, and a data communications module. The analog input module may be connected to the video signal input port. A plurality of video signal parameters may be measurable from the video signal by the signal analysis module. Additionally, the video signal parameters may correspond to a first subset of display device coordination values for the imaging modality. The system may also include a data output port that is linked to the data communications module of the central processor. The data output port may also be connectable to an external device to which the measured video signal parameters are transferred.

In another embodiment of the present invention, there is provided a method for display device management. The method may begin with a step of receiving a video signal from an imaging modality. The video signal may be defined by a plurality of signal parameters corresponding to display device coordination values. The method may then continue with a step of measuring a subset of the signal parameters from the received video signal. The measured subset of the signal parameters may correspond to a first subset of display device coordination values. The method may further include the step of deriving a second subset of display device coordination values from the measured signal parameter. The method include transferring the first and second subset of the display device coordination values to a display device management system.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
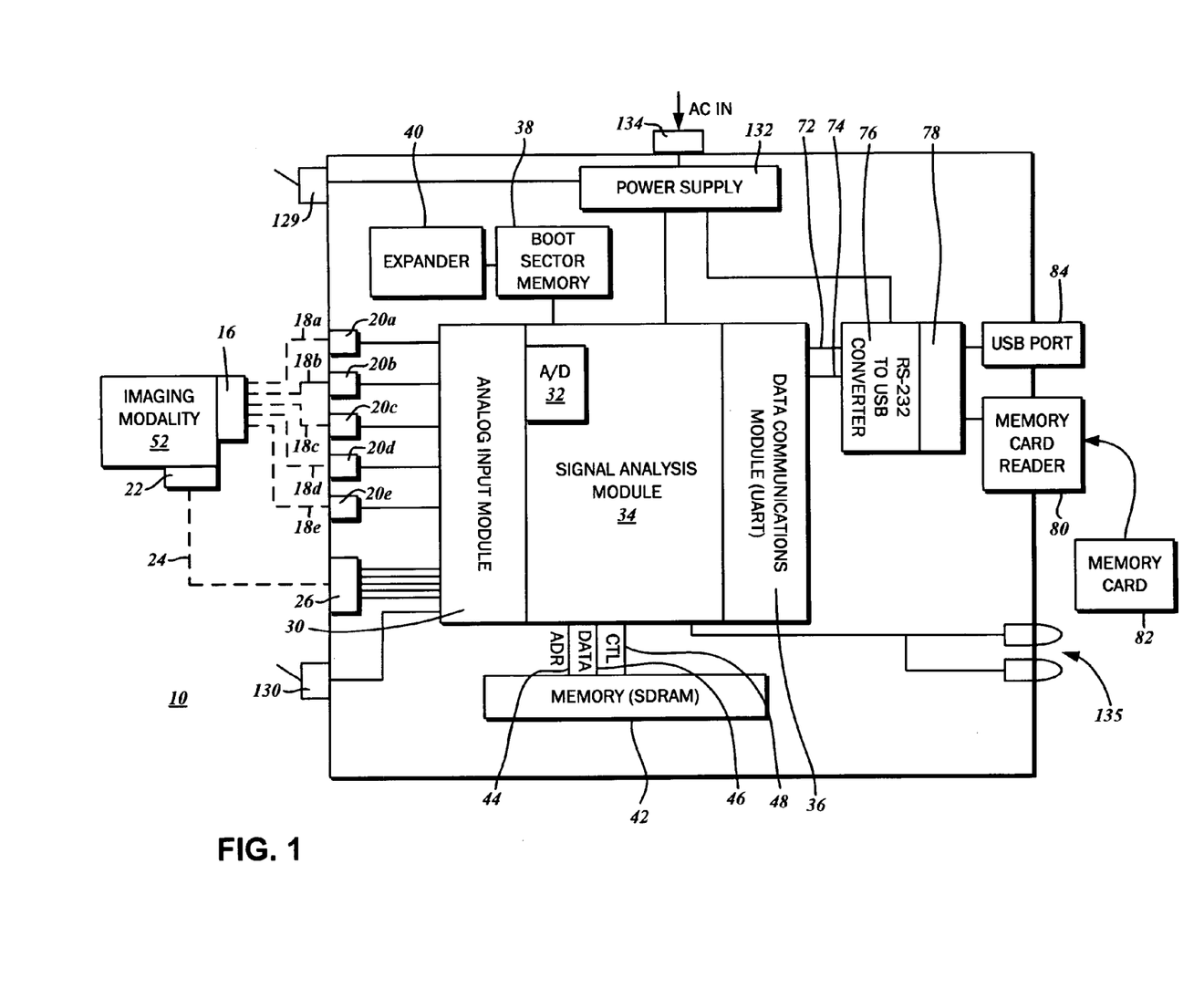
FIG. 1 is a block diagram illustrating various components of the system for analyzing video signals generated by an imaging modality in accordance with one embodiment of the present invention.

With reference to the block diagram of FIG. 1, one embodiment of the present invention contemplates a system 10 for analyzing signals generated by an imaging modality 12. In further detail, the system 10 includes a signal analysis unit 14 that is interconnected to the imaging modality 12. By way of example only and not limitation, the imaging modality 12 may be a Computed Tomography (CT) device, a Magnetic Resonance Imaging (MRI) device, a catheterization imaging device, a Computed Radiography (CR) device, a Positron Emission Tomography (PET) device and other nuclear medicine diagnostic systems, or an ultrasound device.

The imaging modality 12 is understood to generate video signals representative of medical diagnostic information specific thereto, and are defined by various video signal parameters as will be described in further detail below. The video signal parameters are understood to be particular to the imaging modality 12, and a similarly configured or coordinated display device is needed to display the underlying video information properly. It will be appreciated by those having ordinary skill in the art that the imaging modality 12 need not be limited to the foregoing medical devices, and any other imaging modality known in the art may be provided for the various embodiments of the present invention.

Figure 2:
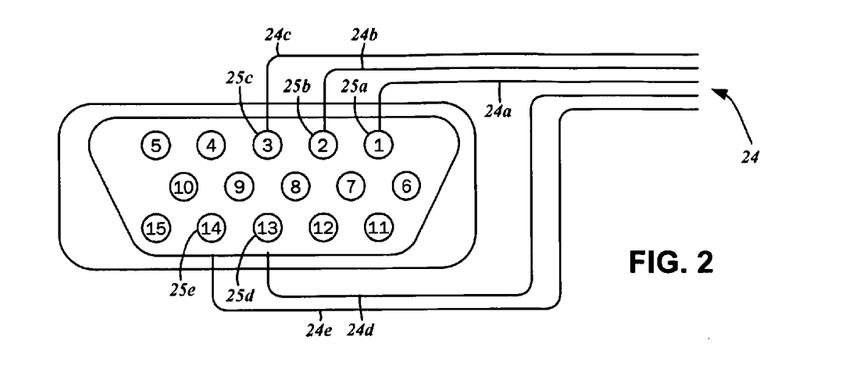
FIG. 2 is a diagram illustrating the pin outs of a D-Subminiature connector utilized in one embodiment of the system for analyzing video signals.

In one embodiment, the imaging modality 12 may be connected to the signal analysis unit 14 in one of two ways. Some imaging modalities 12 have a first type of output module 16 comprising five separate output lines 18 corresponding to a red signal output 18*a*, a green signal output 18*b*, a blue signal output 18*c*, a horizontal sync (Hsync) output 18*d*, and a vertical sync (Vsync) output 18*e*. Each of the separate output lines 18*a-e* may be carried by an individual cable. In some cases, the imaging modality 12 may have less than the five separate output lines 18, and the individual signals may be combined into a composite signal. In order to receive inputs from such an imaging modality 12, the signal analysis unit 14 may include a corresponding set of first input ports 20*a-e*, with the output lines 18*a-e* being connectible thereto. As will be described in further detail below, the first input ports 20*a-e* are BNC (Bayonet Neill Concelman) connectors. Alternative imaging modalities 12 are understood to have a second type of output module 22 with a single output line 24 having multiple pinouts. Referring to FIG. 2, the second output module 22 includes a D-subminiature type connector 25, also known as a VGA connector. According to widely known standards, the first pin or line 25*a* corresponds to a red signal output 24*a*, the second pin or line 25*b* correspond to a green signal output 24*b*, the fourth pin or line 25*c* corresponds to a blue signal output 24*c*, the thirteenth pin or line 25*d* corresponds to a horizontal sync output 24*d*, and the fourteenth pin or line 25*e* corresponds to a vertical sync output 24*e*. The output line 24, which has a matching adapter, is connectible to the second input port 26. It will be recognized that while two types of output modules 16, 22 have been shown together in the imaging modality 12, typically only one type of output is provided. Thus, only one of the first or second input ports 20, 22 need be connected to analyze a single imaging modality 12.

The first input ports 20 and the second input port 26 are electrically connected to a central processor 28, specifically, to an analog input module 30 thereof. According to one embodiment of the present invention, the central processor 28 is a specialized video processing system-on-chip integrated circuit (SOIC) that can be programmed to perform a variety of discrete time signal processing (DSP) operations. One suitable device is the PW328 integrated circuit from PixelWorks of Tualatin, Oregon. However, it will be recognized that any other suitable video processing IC known in the art may be readily substituted. The analog input module 30 receives the signals from the first and second input ports 20, 26 as generated by the imaging modality 12, and converted to a digital signal by an on-board analog to digital converter 32 for processing by a signal analysis module 34 of the central processor 28. Additionally, as will be described in further detail below, a communications link may be established with external devices via a data communications module 36 of the central processor 28.

While reference will be made to the analog input module 30, the signal analysis module 34, and the data communications module 36, it is to be understood that such terms refer to functional divisions of the central processor 28 that are implemented with suitable programming, and not necessarily the specific hardware components thereof. In this regard, it will be recognized that typical video processing ICs such as the central processor 28 include hardware components such as input ports, analog-to-digital converters, a central processing unit (CPU) for executing the programmed instructions, various registers and buffers, and an universal asynchronous receiver transmitter (UART) for external communications, among others. Additionally, such video processing IC may also include specialized output ports for driving a variety of display panels.

The programmed instructions executed by the central processor 28 as part of the steps in a method contemplated in one embodiment of the present invention may be stored in a boot sector flash memory device 38. Any suitable flash memory module may be utilized, such as the AM29LV160D from Advanced Micro Devices (AMD) of Sunnyvale, Calif. It is understood that the boot sector flash memory device 38 is pre-programmed, and once deployed, it is set to be read-only. Additional instructions may be provided in another boot sector flash memory device that is attachable to an expander socket 40, if necessary.

Figure 10:
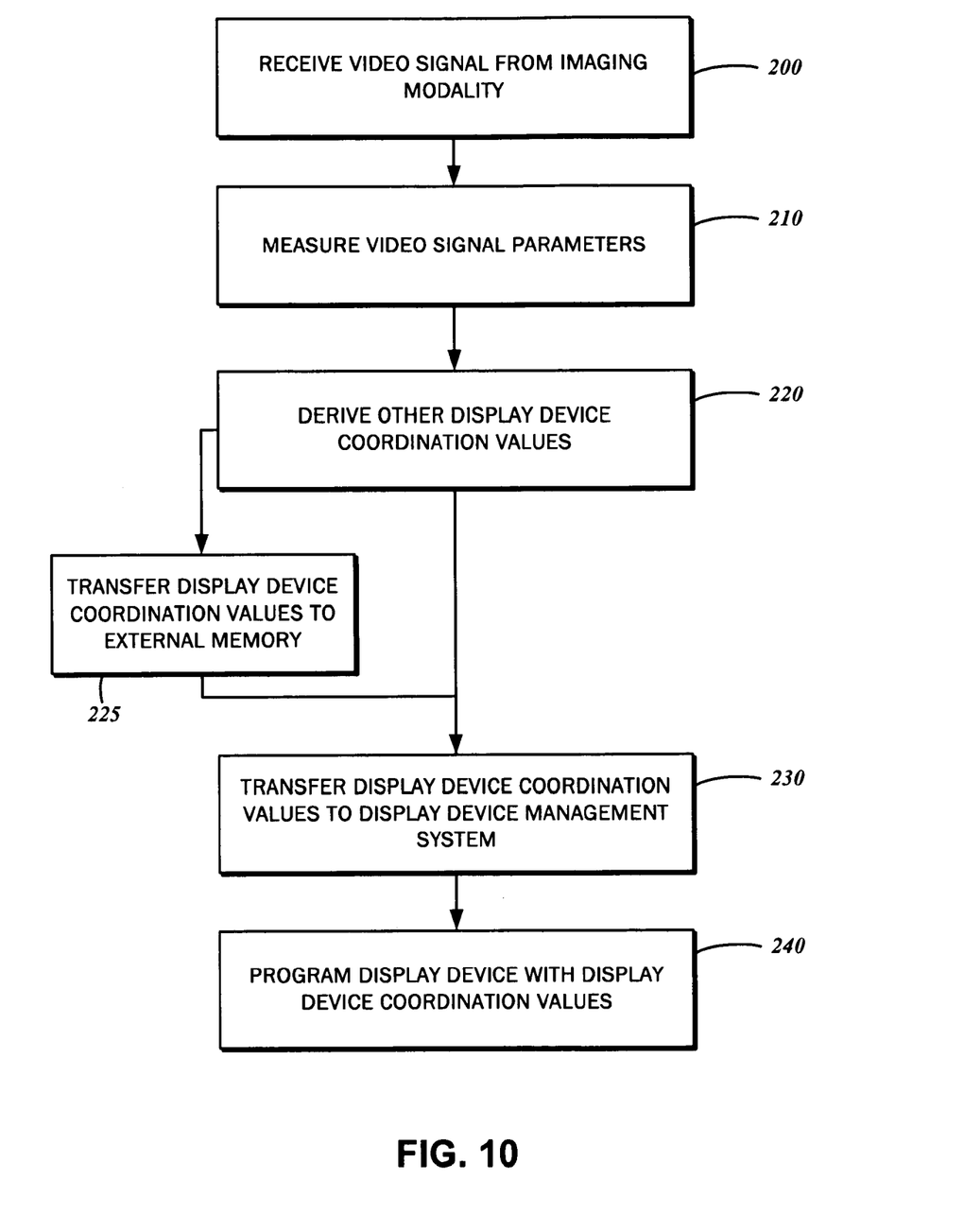
FIG. 10 is a flowchart illustrating the steps of a method for display device management.

With reference to the flowchart of FIG. 10, another embodiment of the present invention contemplates a method for display device management. The method begins with a step 200 of receiving the video signal from the imaging modality 12 through the above-described first and second input ports 20, 26.

The digitized signal from the analog-to-digital converter 32 may be temporarily stored in a random access memory module 42 connected to the central processor 28 for subsequent analysis. In further detail, the memory module 42 includes one or more address lines 44, data lines 46, and control lines 48, which are utilized to store specific data to a specific memory addresses at a specific instruction cycle. The memory module 42 is understood to be a conventional synchronous dynamic random access memory (SDRAM) device.

As briefly indicated above, the signal analysis module 34 measures certain parameters of the video signal received from the imaging modality. More particularly, in step 210, the method continues with measuring the video signal parameters. Among the parameters measured include the horizontal resolution and frequency, and the vertical resolution and frequency. It is understood that horizontal resolution refers to the number of lines across the display field from one vertical edge to the other, while vertical resolution refers to the number of lines down the display field from one horizontal edge to the other. Furthermore, horizontal frequency refers to the rate at which each horizontal line is scanned, and represents the number of horizontal lines displayed per second. Vertical frequency refers to the rate at which the scan line is repositioned from the bottom of the screen to the top of the screen, that is, the refresh rate of every field after having scanned each horizontal line thereof.

Figure 3:
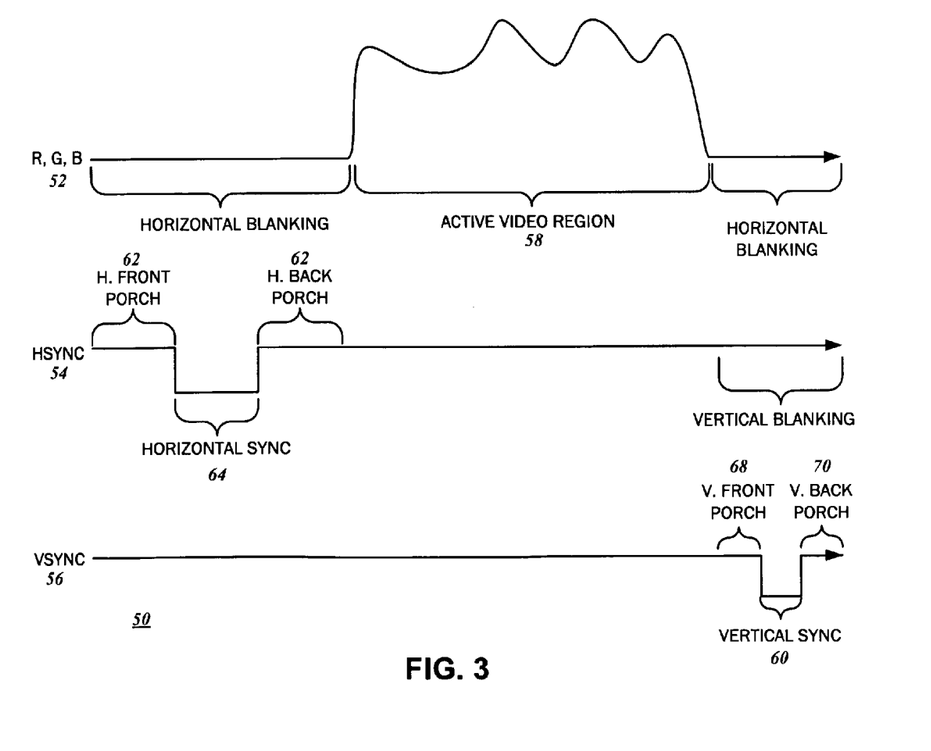
FIG. 3 is a waveform plot of an exemplary video signal, and illustrates the various parameters thereof including horizontal and vertical sync, horizontal and vertical front porch, and horizontal and vertical back porch.

The waveform plots of FIG. 3 illustrate an exemplary video signal against time, and include color component signals 52, a horizontal sync signal 54, and a vertical sync signal 56. All of the display information is set forth in the color component signals 52, specifically in an active video region 58. Although only one plot is shown, it is to be understood that there are separate waveforms for each color component of red, green, and blue. It is also to be understood, however, that the color components as well as the horizontal sync signal 54 and the vertical sync signal 56 may be variously combined into different composite signals, depending upon the particularities of the imaging modality 12. The horizontal resolution can be determined from the measured period of the active video signal, and the horizontal frequency is the inverse of the time period between the beginning and end of the active video region 58. The vertical resolution can be determined by counting the number of horizontal active video regions 58 between successive vertical sync pulses 60, while the vertical frequency is the inverse of the time period between successive vertical sync pulses 60. Once these measurements are taken, they may be stored in the memory module 42.

It is contemplated that the aforementioned measured video signal parameters correspond to a subset of display device coordination values, or values that must be programmed into a display device for the correct and compatible display of the video signal thereby. For the most part, the term "measured video signal parameters" is utilized interchangeably herein with the term "display device coordination values" because both generally refer to the parameters synchronized between the display device and the imaging modality 12. Specific references to the measured video signal parameters as above are in the context of the measurements being made by the signal analysis module 34.

In addition to the measured video signal parameters, above, the video signal 50 is also defined by additional parameters that are understood to comprise another subset of display device coordination values. The method in accordance with one embodiment of the present invention continues with a step 220 of deriving the additional display device coordination values. With further particularity, the horizontal sync signal 54 is defined by a horizontal front porch 62, a horizontal sync pulse 64, and a horizontal back porch 66. The horizontal front porch 62 is defined as the time between the end of the active video region 58 of the previous cycle and the leading edge of the horizontal sync pulse 64. The horizontal back porch 66 is defined as the time between the trailing edge of the horizontal sync pulse 64 and the beginning of the next active video region 58. The vertical sync signal 56 is understood to be similarly defined by a vertical front porch 68, the vertical sync pulse 60 with a pulse width, and a vertical back porch 70. The vertical front porch 68 is the time period between the end of the previous active video region 58 and the leading edge of the vertical sync pulse, while the vertical back porch 70 is the time period between the trailing edge of the vertical sync pulse 60 and the leading edge of the subsequent horizontal sync pulse 64.

According to one embodiment of the present invention, the horizontal sync pulse 64, the horizontal front porch 62, the horizontal back porch 66, the vertical sync pulse 60, the vertical front porch 68, and the vertical back porch 70 are derived from the measured video signal parameters of the video signal 50. The signal analysis module 34 is contemplated to derive these values. The horizontal back porch 66, the horizontal sync pulse 64, and the horizontal back porch 66 are by default assumed to be the inverse of the horizontal frequency divided by a hundred, the quotient thereof multiplied by twenty, and the product thereof divided by 3:

$$\left(\left(\frac{1}{\text{Vertical Frequency (in MHz)}}\Big/100\right)\times 20\right)\Big/3$$

The vertical front porch 68, the vertical sync pulse 60, and the vertical back porch 70 are by default assumed to be the vertical resolution multiplied by the inverse of the horizontal frequency, the product thereof being subtracted from the inverse of the vertical frequency, the difference thereof being divided by 3:

$$\left(\left(\frac{1}{\text{Vertical Frequency (in KHz)}}\right)-\left(\text{Vertical Resolution}\times\left(\frac{1}{\text{Horizontal Frequency (in KHz)}}\right)\right)\right)\Big/3$$

The foregoing values may be derived by the central processor 28 and then stored in the random access memory module 42 for subsequent retrieval and use. Alternatively, a lookup table of pre-calculated video signal parameters, to which the measured video signal parameters are indexed, may be utilized to derive the remainder of the display device coordination values. The lookup table may be stored in the boot sector flash memory device 38.

As indicated above and as shown in FIG. 1, the central processor 28 includes the on-board data communications module 36 for exchanging data with external devices. In one contemplated embodiment, the data communications module 36 is a serial UART transceiver compatible with the RS-232 standard, and includes a single transmit line 72 and a single receive line 74. The transmit line 74 and receive lines 76 are, in turn, connected to an RS-232 to Universal Serial Bus (USB) converter 76 that includes a USB port 78. As will be readily recognized, the RS-232 to Universal Serial Bus (USB) converter 76 essentially carries the RS-232 over standard USB signals, and a software driver on the receiving end decodes and processes the extracted RS-232 signals. The converter 76 provides a number of USB ports 78, the mechanical details of the connectors for which will be discussed more fully below.

The USB ports 78 are connectable to an external device for the transfer of the display device coordination values. One embodiment of the present invention includes a USB external memory card reader 80 that receives a flash memory card 82. Accordingly, in step 225, the display device coordination values are stored in the flash memory card 82. In another embodiment, the USB port 78 on the converter 76 is connected to an externally accessible USB port 82.

Figure 4:
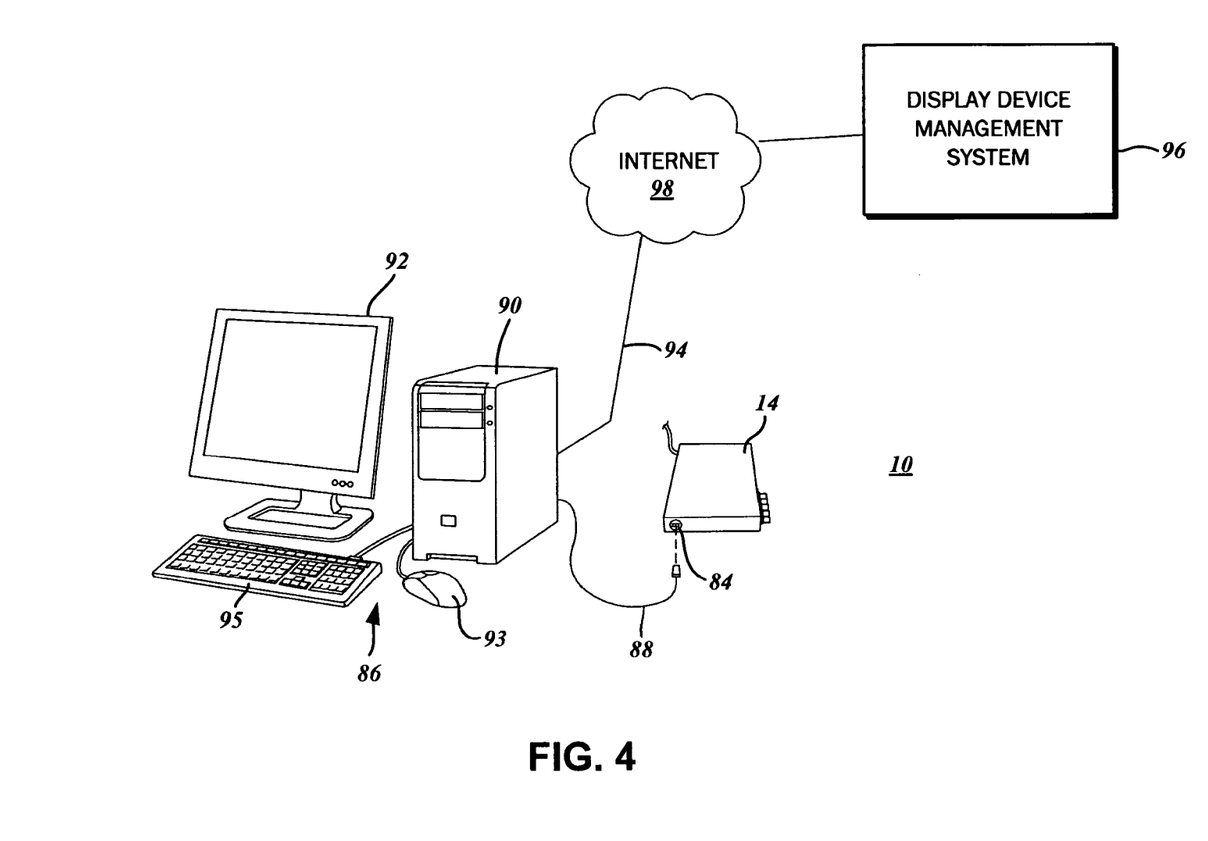
FIG. 4 is a block diagram illustrating another aspect of the system for analyzing video signals including a general-purpose computer system and a remotely located display device management system.

With reference to the block diagram of FIG. 4, the signal analysis unit 14 is connected to a general-purpose computer system 86 over a USB interlink 88, and a data communications link may be established between the same. By way of example only and not of limitation, the general-purpose computer system 86 includes a system unit 90, a monitor 92, a mouse input device 94, and a keyboard input device 96. The system unit 90 may utilize any operating system having a graphical user interface (GUI), such as WINDOWS from Microsoft Corporation of Redmond, Washington, MACOS from Apple, Inc. of Cupertino, Calif., various versions of UNIX with the X-Windows windowing system, and so forth. The system unit 90 executes one or more computer programs, with the results thereof being displayed on the monitor 92. Generally, the operating system and the computer programs are tangibly embodied in a computer-readable medium, e.g. one or more of the fixed and/or removable data storage devices. The computer programs comprise instructions that, when read and executed, cause the performance of the steps in accordance with one embodiment of the present invention. The computer system 86 represents only one exemplary apparatus suitable for implementing aspects of the present invention. As such, the computer system 86 may have many different configurations and architectures. Any such configuration or architecture may be readily substituted without departing from the scope of the present invention.

It is expressly contemplated that the system unit has a network interface 94 to connect to a display device management system 96 over the Internet 98. The display device coordination values transferred from the signal analysis unit 14 to the general-purpose computer system 86 are transmitted to the display device management system 96 for further action in accordance with a step 230 of the method per one embodiment of the present invention.

Figure 5:
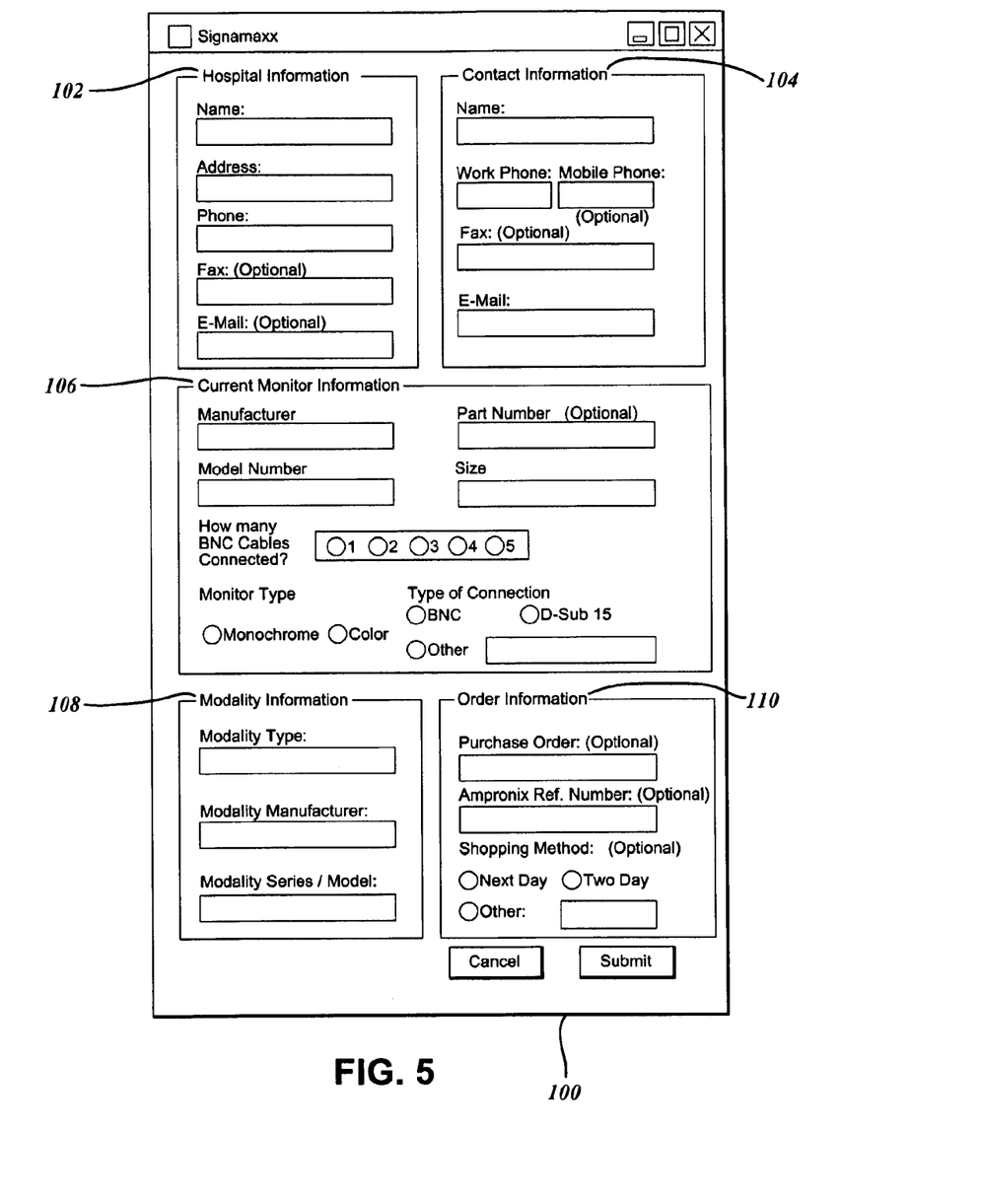
FIG. 5 is a screen shot of an exemplary display device order form as shown to a user prior to placing an order for a new display.

Referring to the exemplary screenshot of FIG. 5, the user is presented with a display device order form 100 to be filled out in order to facilitate processing by the display device management system 96 before transferring the display device coordination values to the same. The exemplary display device order form 100 includes a hospital information block 102 in which the name, address, phone, fax, and e-mail of the hospital that owns the imaging modality 12 is entered. A contact block 104 is also included, where the details of a particular individual responsible for the management of the displays for the imaging modality 12 are entered, including name, phone numbers, fax numbers, and e-mail. The display device order form 100 also solicits details about the display device being replaced in a monitor information block 106, which includes the manufacturer, the model number the part number, and the size. Connection details such as the number and type of cables connected from the imaging modality 12 to the signal analysis unit 14 for the analysis are specified, and whether the display device is monochrome or color. Additionally, the display device order form 100 includes a modality information block 108 in which details regarding the imaging modality 12 such as the type, manufacturer, and model identification are entered, and an order information block 110 for providing sales data such as purchase order number, internal reference number, shipping methods, and so forth.

While the specifics of the types of information entered into the display device order form 100 are described, it is by way of example only and not of limitation. Other types of information may be requested on the display device order form 100.

The transfer of the display device coordination values and the information entered into the display device order form 100 may proceed in any number of ways. For example, the general-purpose computer system 86 may establish a direct link to a corresponding application running on the display device management system 96 in a client-server relationship. Alternatively, the aforementioned data may be encapsulated into a file, and transferred to the display device management system 96 over electronic mail. Those having ordinary skill in the art will recognize that other data transfer modalities may also be substituted. It is additionally contemplated that prior to the transmission, the display device coordination values may be encrypted with any one of well-known data encryption algorithms. Upon receipt by the display device management system 96, it is understood that such encrypted values are decrypted prior to display.

Figure 6:
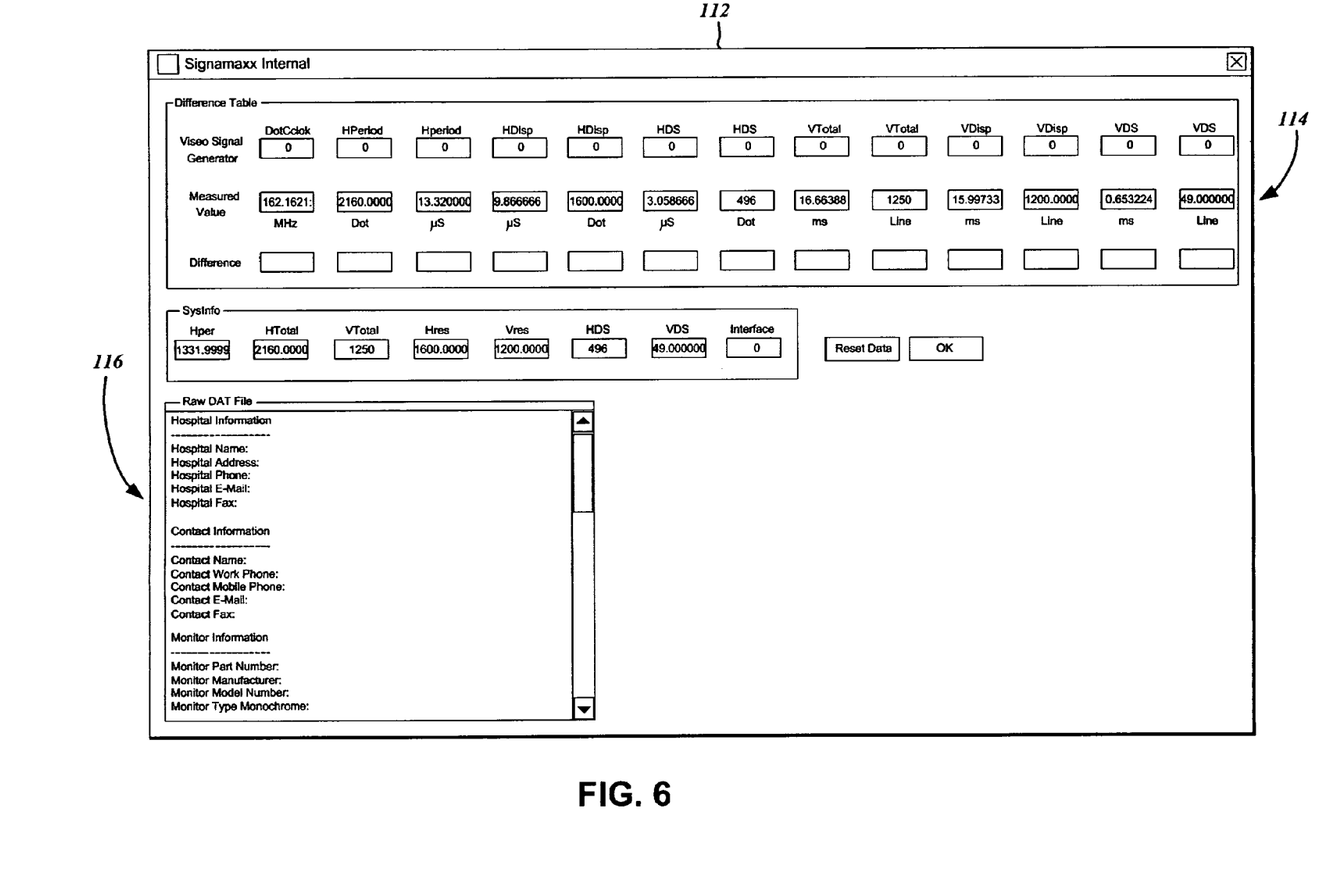
FIG. 6 is a screen shot of an management interface viewable by the display device management system in accordance with one embodiment of the present invention.

The information entered into the display device order form 100 is combined with the display device coordination values for transmission to the display device management system 96. As shown in the FIG. 6, the received data is formatted and displayed in an exemplary management interface 112. In particular, the measured video display parameters are shown in a table 114, while the information entered into the display device order form 100 is listed in an order information block 116. Based upon the information on the management interface 112, a technician may properly program a replacement device with the display device coordination values in accordance with an optional step 240, and ship the same to the customer originating the order.

Figure 7:
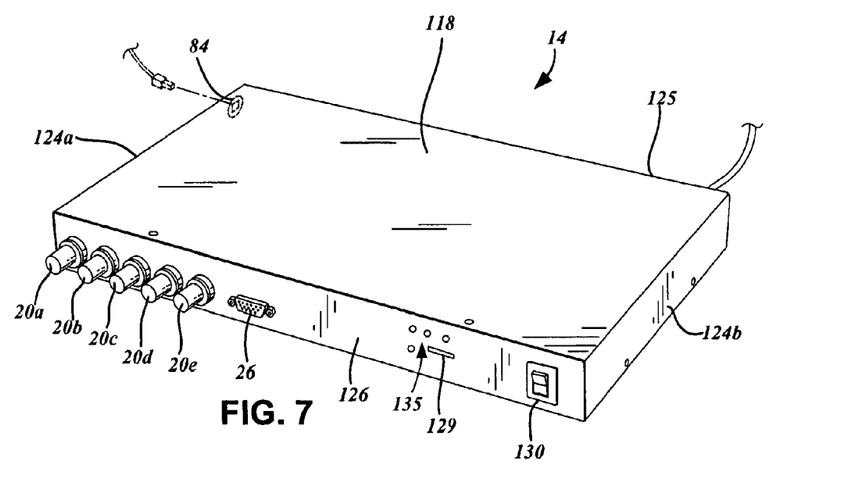
FIG. 7 is a perspective view showing one aspect of the system for analyzing video signals in accordance with one embodiment.
Figure 8:
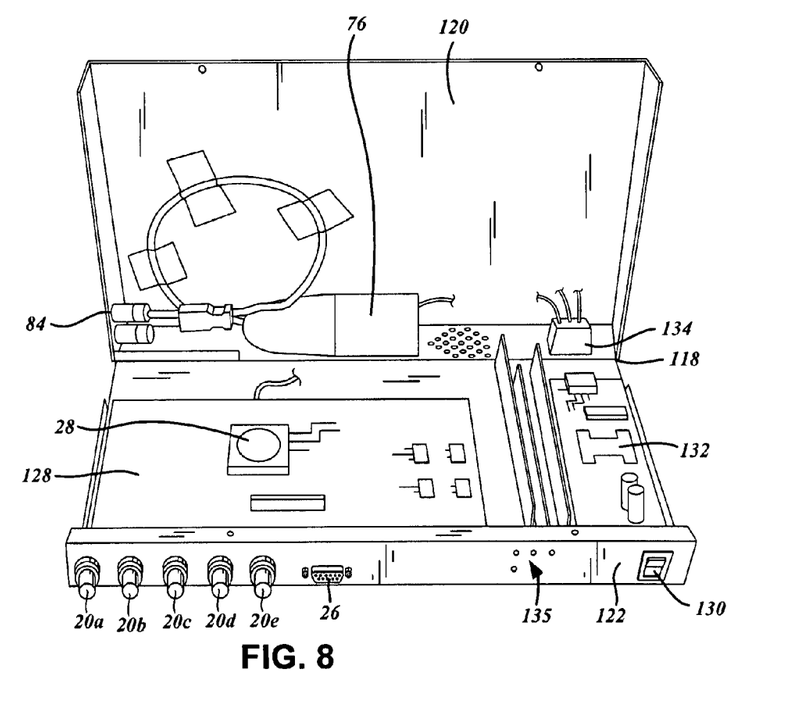
FIG. 8 is a frontal perspective view of the system for analyzing video signals with a top cover thereof removed and showing its various hardware components.

Referring again to the block diagram of FIG. 1, and additionally to the perspective views of an exemplary embodiment of the signal analysis unit 14 shown in FIGS. 7 and 8, the various electronics components and connectors described above are enclosed in a housing 118. More particularly, the housing 118 has a rectangular configuration defined by an upper housing 120 and a lower housing 122 in an interlocking relationship. The upper housing 120 defines the left and right sides 124*a*, 124*b*, respectively, of the housing 118, as well as the rear face 125 thereof. The lower housing 122, on the other hand, defines a front face 126 of the housing 118. Attached to the lower housing 122 is a printed circuit board 128 that has mounted thereon the above-described electronic components including the central processor 28, the boot sector flash memory device 38, the memory module 42, among others. The BNC connectors of the first input ports 20*a-e* are mounted to the printed circuit board 128, and extend from the front face 126. Similarly, the VGA connector of the second input port 26 is likewise mounted to the printed circuit board 128. The VGA connector is disposed on the front face 126 for simplified access thereto.

The front face 126 also includes a power switch 130 for turning on and turning off the signal analysis unit 14. In further detail, the power switch 130 is connected to a power supply circuit 132 that regulates the incoming power signal from a power socket 134 disposed on the rear face 125 of the housing 118. It is contemplated that conventional alternating current (AC) power is supplied through the power socket 134, which is a 110V three prong connector. The AC power signal is then converted to a direct current signal by the power supply circuit 132 to power the various devices on the printed circuit board 128. Those having ordinary skill in the art will readily recognize that any one of numerous power supply circuits known in the art may be utilized in the signal analysis unit 14. A set of light emitting diodes (LEDs) 135 are attached to the front face 126 to indicate the power and operational status of the signal analysis unit 14.

The analysis of the video signal from the imaging modality 12 may be initiated with a pushbutton selector switch 129, which is tied to one of the inputs of the central processor 28. When the selector switch 129 is activated, the input to the central processor 28 initiates the execution of the programmed instructions corresponding to the steps of the method for display device management. By way of example, the sequence of using the video analysis system 10 may begin with powering on the signal analysis unit 14. After confirming the active state as displayed by the LEDs 135, the imaging modality 12 is connected to the input ports 20, 26. The selector switch 129 is pressed until all the measurements have been completed, at which point the LEDs 135 may flash to indicate completion. The signal analysis unit 14 may then be powered down and connected to the general-purpose computer system 86 as described above to begin transferring the display device coordination values.

Figure 9:
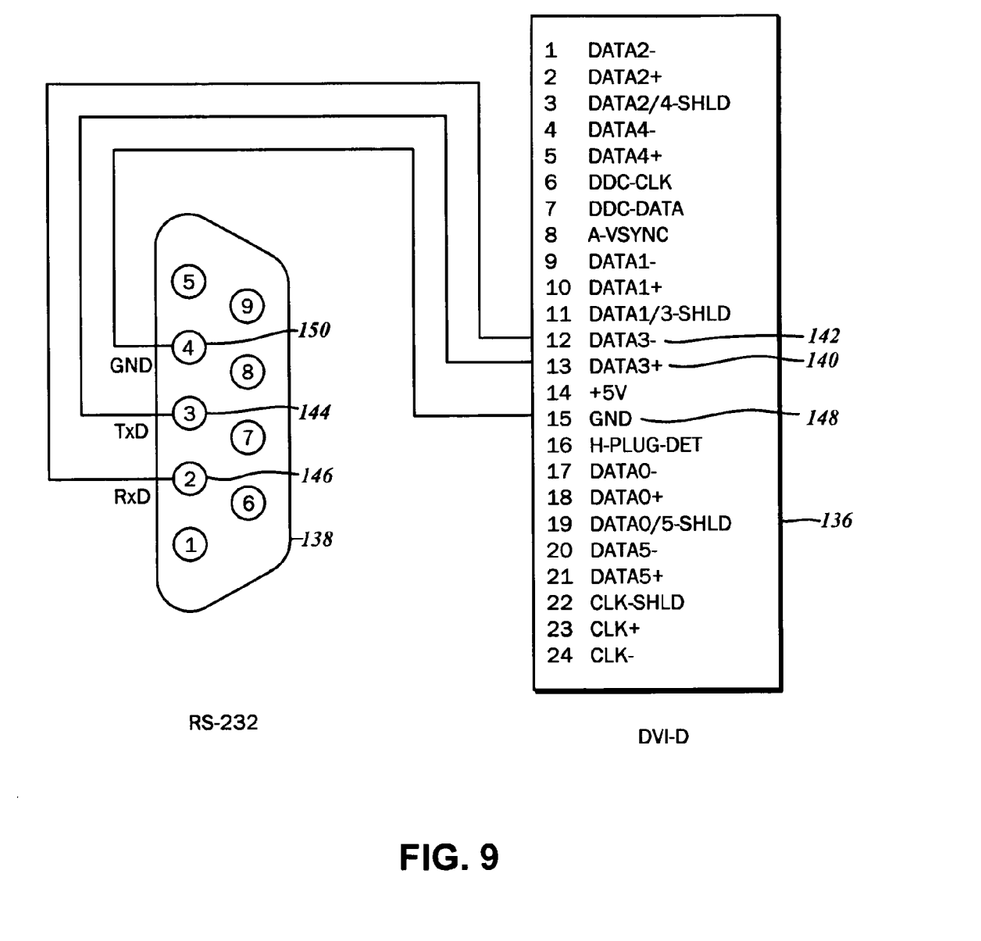
FIG. 9 is wiring diagram illustrating the interfacing of a DVI-D connector to a DB-9 connector to link incompatible wiring configurations in the system for analyzing video signals.

Mounted to the upper housing 120 is the RS-232 to USB converter 76, which is connected to the data communications module 36 of the central processor 28. As shown in the wiring diagram of FIG. 9, the connector interface 136 to the central processor 28 may be of the DVI-D type. Accordingly, there may be a secondary DB-9 adapter 138 attachable to the RS-232 to USB converter 76. In this regard, a thirteenth pin 140 and a twelfth pin 142 of the DVI-D connector interface 136 are connected to the third and second pins 144, 146, respectively, of the DB-9 adapter 138. A fifteenth pin 148 of the DVI-D connector interface 136 and a fifth pin 150 are understood to be designated ground, and are therefore connected. The USB port 84 is connected to the RS-232 to USB converter 76, and mounted to the left side 124*a* of the upper housing 120 to be accessible therefrom. It is contemplated that the USB-end of the RS-232 to USB converter 76 is a type "A" connector, and the USB port 84 is a type "B" connector. A USB connector on the general-purpose computer system 86 may be a type "A" connector. Notwithstanding the specific connector types noted herein, it will be recognized that any suitable connector type may be substituted.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. A system for analyzing indeterminate video signals generated by an imaging modality, the system comprising:
a video signal input port, a signal output of the imaging modality being connectible thereto;
a central processor including an analog input module connected to the video signal input port, a signal analysis module, and a data communications module, a plurality of video signal parameters being quantified as particular video signal parameter values from the indeterminate video signal by the signal analysis module and output therefrom as a set of multiple numerical values, the video signal parameter values corresponding to a first subset of display device coordination values necessary for synchronized displaying, of the video signals as generated by the imaging modality on a display device independently connectible thereto; and
a data output port linked to the data communications module of the central processor, the data output port being connectable to an external device to which the set of multiple numerical values of the quantified video signal parameters are transferred.

2. The system of claim 1, wherein a one of the plurality of video signal parameters is selected from a group consisting of: horizontal frequency, horizontal resolution, vertical frequency, and vertical resolution.

3. The system of claim 1, wherein the video signal input port has a plurality of signal lines at least corresponding, to a green signal line, a red signal line, a blue signal line, a vertical sync line, and a horizontal sync line.

4. The system of claim 3, wherein the video signal input port is a Video Graphics Array (VGA) connector interface including the signal lines.

5. The system of claim 3, wherein the video signal input port is comprised of as plurality of BNC connectors each corresponding to the signal lines 6. The system of claim 1, wherein the signal analysis module derives a second subset of display device coordination values for the imaging modality from the set of multiple numerical values of the quantified video signal parameters, the second subset of display device coordination values being transferable. to the external device through the data output port.

7. The system of claim 1, further comprising:
a memory module coupled to the central processor, the set of multiple numerical values of the quantified video signal parameters being temporarily stored therein.

8. The system of claim 1, wherein the external device is a removable memory card connectible to the data output port over a Universal Serial Bus (USB) memory card reader.

9. The system of claim 1, wherein the external device. is a general-purpose computer system having a user interface and a network interface.

10. The system of claim 9, further comprising:
a remotely located display device management system in communication with the general-purpose computer system over the network interface.

11. The system of claim 10, wherein the user interface of the general-purpose computer system includes a display device order form, information entered therein being appended to the set of multiple numerical values of the quantified video signal parameters transmitted to the display device management system.

12. The system of claim 9, wherein the data output port is a Universal Serial Bus (USB) interface to the general-purpose computer system.

13. A method for display device management, the method comprising:
receiving an indeterminate video signal from an imaging modality, the video signal being defined by a plurality of signal parameters corresponding to display device coordination values;
quantifying a subset of the signal parameters corresponding to a first subset of display device coordination values from measurements of the received video signal;
generating numerical values for the first subset of display device coordination values;
deriving a second subset of display device coordination values from the first subset of display device coordination values;
generating numerical values for the second subset of display device coordination values; and
transferring the generated numerical values of the first and second subset of the display device coordination values to a display device management system.

14. The method of claim 13, wherein the video signal input is comprised at least of a green signal line, a red signal line, a blue signal line, a vertical sync line, and a horizontal sync line.

15. The method of claim 13, wherein a one of the signal parameters is selected from a group consisting of: horizontal frequency, horizontal resolution, vertical frequency, and vertical resolution.

16. The method of claim 13, wherein a one of the second subset of display device coordination values is selected from a group consisting of horizontal sync frequency, vertical sync frequency, horizontal front porch, horizontal back porch vertical front porch, and vertical back porch.

17. The method of claim 13, wherein the second subset of display device coordination values are retrieved from a lookup table based upon the numerical values of the first subset of display device coordination values.

18. The method of claim 13, further comprising:
storing the numerical values of the first and second subsets of the display device coordination values to a removable memory device.

19. The method of claim 13, further comprising:
programming a display device with the numerical values of the first and second subsets of display device coordination values, the programmed display device being capable of cooperating with the imaging modality to display the video signal thereon.

20. The method of claim 13 further comprising:
encrypting the numerical values of the first and second subsets of the display device coordination values prior to the transfer to the display device management system; and
decoding the numerical values of the first and second subsets of the display device coordination values upon receipt by the display device management system.

21. The method of claim 13, wherein the step of transferring the numerical values of the first and second subsets of the display device coordination values includes:
establishing a local data communications link to a general-purpose computer system;
transmitting the numerical values of the first and second subsets of the display device coordination values to the general-purpose computer system over the local data communications link.

22. The method of claim 21 wherein the local data communications link is a Universal Serial Bus (USB) connection.

* * * * *